(No Model.)

S. B. EZELL.
PLOW.

No. 307,756. Patented Nov. 11, 1884.

WITNESSES
C. W. Dashiell
W. W. Mortimer

Samuel B. Ezell
INVENTOR

By C. A. Snow & Co.
Attorney

UNITED STATES PATENT OFFICE.

SAMUEL B. EZELL, OF SPARTANBURG, SOUTH CAROLINA.

PLOW.

SPECIFICATION forming part of Letters Patent No. 307,756, dated November 11, 1884.

Application filed June 21, 1884. (No model.)

*To all whom it may concern:*

Be it known that I, SAMUEL B. EZELL, a citizen of the United States, residing at Spartanburg, in the county of Spartanburg and State of South Carolina, have invented a new and useful Plow, of which the following is a specification, reference being had to the accompanying drawings.

My invention relates to a combined cotton plow and chopper; and it has for its object to provide a device of this character which shall be cheap and simple in its construction and effective in its use, and to provide improved means for chopping the cotton after it has been plowed.

With these ends in view the invention consists in the improved construction and combinations of parts, hereinafter fully described, and pointed out in the claim.

Figure 1:
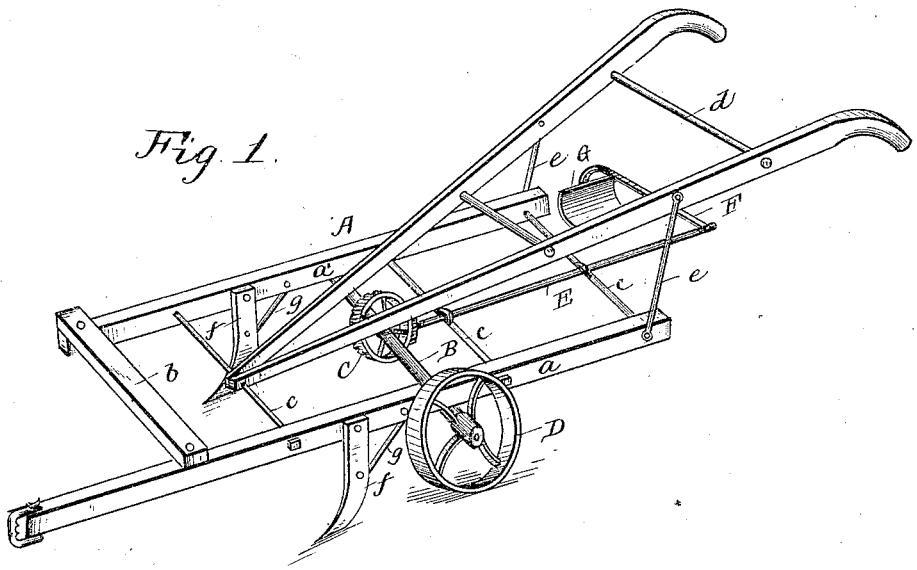
Figure 2:
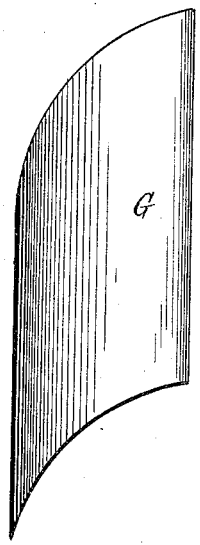

In the drawings, Figure 1 is a perspective view of a cotton plow and chopper constructed in accordance with my invention. Fig. 2 is a detail view of the chopping-blade.

In the accompanying drawings, in which like letters of reference indicate corresponding parts in both the figures, A represents the frame, which consists of the parallel side beams, $a\ a'$, the beam $a'$ being slightly extended beyond the beam $a$, as shown, the said beams being connected and braced by a beam, $b$, on a line with the forward end of the beam $a$, and braced by rods $c$ at suitable intervals. Upon the forward ends of the rods are mounted or secured the forward ends of the plow-handles, which converge at their forward ends, as shown. The rear ends of these handles are connected and braced by a beam, $d$, and are also braced by upright rods $e$, extending upwardly from the rear ends of the beams $a\ a'$.

Near the forward ends of the beams $a\ a'$ are secured plow-shoes $f$, which are curved forwardly, as shown, and braced against rearward displacement by a diagonal brace-rod, $g$.

Mounted in bearings secured to the under side of the beams $a\ a'$, at about the center of the frame, is a shaft, B, at about the center of which is mounted a cog-wheel, C. One end of the shaft B extends beyond the side of the beam $a'$, and is provided at its end with a carrying-wheel, D, constructed of cast-iron, preferably, and having a broad bearing-surface.

E represents a shaft which is mounted in brackets secured to the rods $c$ in rear of the shaft B. This shaft is provided at its forward end with a bevel gear-wheel, which is adapted to mesh with the gear-wheel C of the shaft B. This shaft E extends a slight distance beyond the rear end of the plow-frame, and is provided at its end with an arm, F, which is curved slightly downward at its end, as shown. Upon the end of this arm F is mounted or suitably secured the chopper G, which, as shown in Fig. 2, is curved outwardly at one end and inwardly at the other end. Said cutter is also curved longitudinally to form a scoop. The forward end of the beam $a$ is provided with a clevis, to which the single-tree is to be secured.

In operation the horse is attached to the beam $a'$, so that in moving forward the rows will not be trampled upon, as the horse walks between the adjacent rows. The forward movement of the plow imparts motion to the carrying-wheel, which in turn communicates motion to the shaft, thus turning the gear-wheel, which revolves the chopper-shaft by means of the pinion-wheel. The chopper-shaft revolves the chopper, which chops spaces, leaving the remaining plants in hills.

It will be seen that in this construction of plow and chopper the horse walks between the rows, and thus liability to trample the hills is obviated. Moreover, but one hoe or chopper is employed.

Having fully described my invention, what I claim as new, and desire to secure by Letters Patent, is—

The combination, with a frame having the extended side beam, $a$, of a shaft located at about the middle of said frame, a carrying-wheel mounted on one end of said shaft outside the frame, a gear-wheel mounted on said shaft, a shaft located at right angles to the shaft B, and carrying at its forward end a pinion-wheel adapted to mesh with the gear-wheel, an arm secured to the rear end of said shaft, said arm being bent downwardly at its end, and a chopper secured to said arm, as set forth.

In testimony that I claim the foregoing as my own I have hereto affixed my signature in presence of two witnesses.

SAMUEL B. EZELL.

Witnesses:
B. G. LAMBRIGHT, Jr.,
W. H. CLARK.